INVENTORS
GEORGE WILLIAM BROWNING
LAMBERT G.M.A. VAN GROOS
HAROLD PROCTOR
IAN KAY OPENSHAW
BY Watts, Hoffmann,
Fisher & Heinke
Attorneys.

INVENTORS.
GEORGE WILLIAM BROWNING
LAMBERT G.M.A. VAN GROOS
HAROLD PROCTOR
IAN KAY OPENSHAW
BY Watts, Hoffmann,
Fisher & Heinke
Attorneys.

INVENTORS.
GEORGE WILLIAM BROWNING
LAMBERT G.M.A. VAN GROOS
HAROLD PROCTOR
IAN KAY OPENSHAW
BY Watts, Hoffmann, Fisher & Heinke
Attorneys.

Patented Dec. 8, 1970

3,546,453
X-RAY ANALYZING APPARATUS HAVING A PLURALITY OF CRYSTALS MOUNTED ON A CRYSTAL CHANGING CARRIER
George William Browning, Sale, Lambert George Marien Albert Van Groos, Timperley, Harold Proctor, Stockport, and Ian Kay Openshaw, Sale, England, assignors to Associated Electrical Industries Limited, London, England, a British company
Filed Mar. 28, 1967, Ser. No. 626,576
Claims priority, application Great Britain, Mar. 30, 1966, 14,127/66
Int. Cl. G01n 23/22
U.S. Cl. 250—51.5
20 Claims

ABSTRACT OF THE DISCLOSURE

X-ray analyzing apparatus of the kind in which a solid is bombarded to emit X-rays which are reflected by a crystal and the angle of reflection is measured to determine the nature of the element emitting the X-rays. Several crystals are mounted on a crystal changing carrier so that by changing the crystal, elements over different bands of the periodic table may be detected.

---

This invention relates to X-ray analyzing apparatus.

It is known that when a solid body is bombarded with an electron beam of sufficient intensity, X-rays are produced and also that the wavelength of the principal X-rays will depend upon the atomic number of the element emitting the radiation.

It is also known that when X-rays fall on a known crystal to produce reflections, these X-rays reflect at a Bragg angle $\theta$ given by the expression:

$$\sin \theta = \frac{n\lambda}{2d}$$

where $\lambda$ is the wavelength, $n$ is an integer, and $d$ is a constant associated with the crystal.

The term X-ray analyzer as used herein is intended to mean apparatus adapted to analyze solid bodies by bombarding a specimen with electrons to cause it to emit X-rays, reflecting the X-rays by a crystal, and measuring the angle of reflection of the X-rays to determine the X-ray wavelength and hence the element or elements comprising that part of the specimen which is emitting the X-rays.

Now from the expression for the Bragg angle, it follows that the angle of reflection of the X-rays, as well as being dependent upon the wavelength of the X-rays, is also dependent upon the material of the crystal used as the reflector.

It follows therefore that X-ray analyzing apparatus described above will only be practicable over a band of X-ray wavelengths dependent upon the type of reflecting crystal used and therefore will only detect elements over a range which is only a fraction of the periodic table.

The main object of the invention is to provide improved X-ray analyzing apparatus of the kind referred to in which a large proportion of the elements in the periodic table can be detected.

According to the present invention, an X-ray analyzing apparatus includes means for reflecting X-rays emitted from a specimen bombarded with electrons and means for measuring the angle of reflected X-rays in which the reflector includes a holder carrying a plurality of reflecting crystals and means whereby any one of said crystals can be positioned in the X-ray path by adjustment of the holder. Each of said crystals has suitable reflecting properties over a different X-ray band. The apparatus may include a specimen chamber having an X-ray window and means for opening said window to allow direct passage of X-rays to the reflector or for alternatively vacuum sealing said window.

The number of crystals employed will depend upon the range of elements to be covered.

Apparatus provided with four suitably selected crystals can be arranged to cover the useful range of elements in the periodic table. The apparatus can have a wide range of applications.

A suitable combination of crystals is lithium fluoride, mica, KAP and stearate.

Preferably, in the vacuum sealed condition, the window is covered with material transparent to the shorter wavelength X-rays.

While it is preferred to confine stray electrons within the specimen chamber while at the same time allowing passage of X-rays through the window, it has been found that greatly improved results can be obtained at the longer X-ray wavelengths if there is direct communication between the specimen and reflector.

Preferably, collimating means are provided for removing stray rays which may cause noise especially at the longer X-ray wavelengths.

In order that the invention may be more clearly understood, reference will now be made to the accompanying drawings in which.

Figure 1:
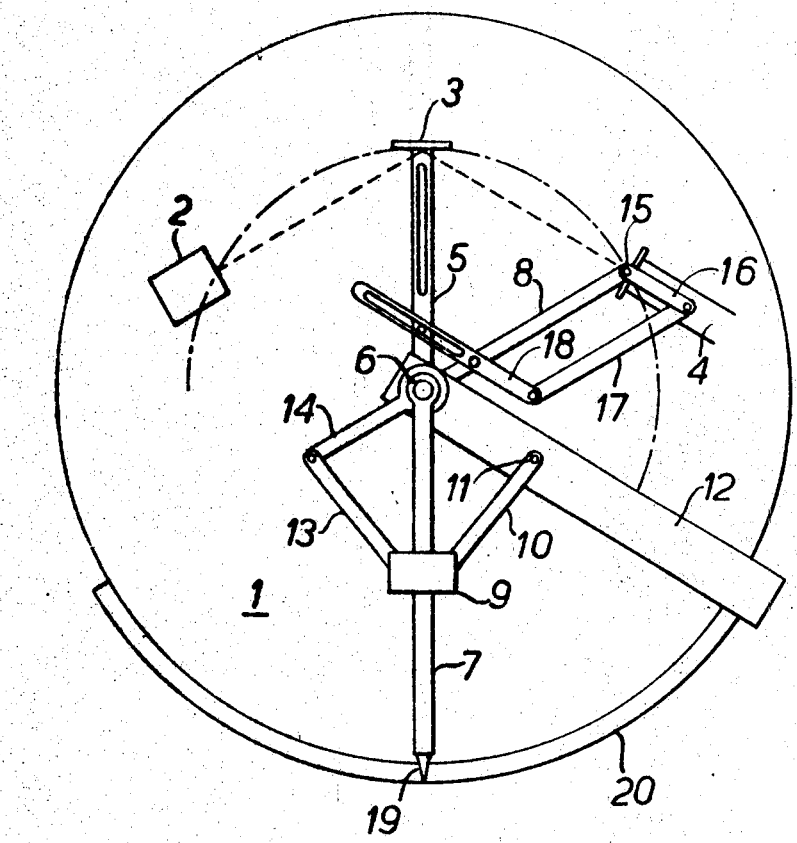
FIG. 1 is a diagrammatic view of an X-ray analyzer.
Figure 2:
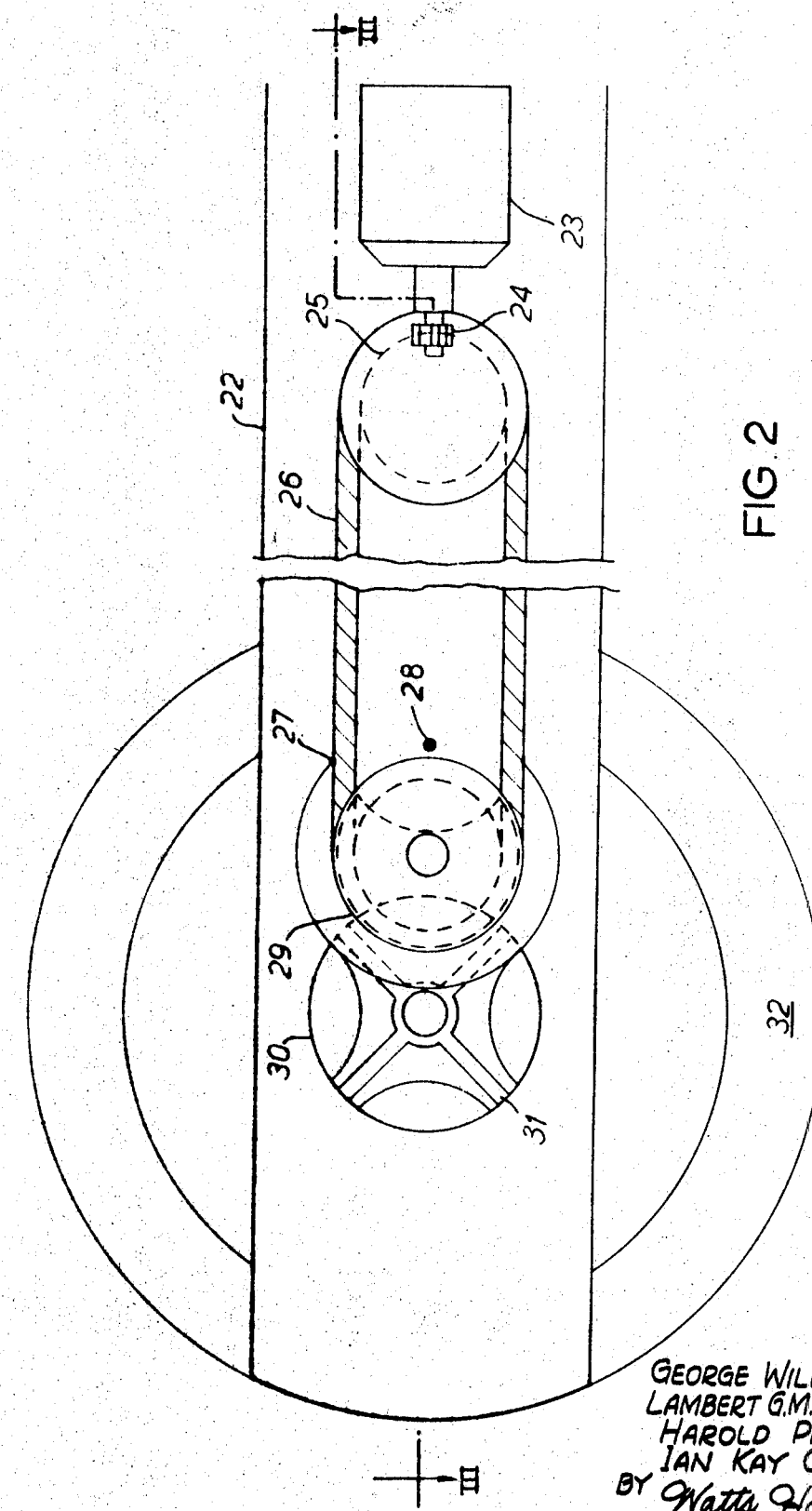
FIG. 2 is a plan view of a pivotal arm carrying reflecting crystals, showing part of the crystal changing mechanism.

In FIG. 1 showing the general arrangement of an X-ray analyzer, the reference numeral 1 indicates generally the top of a table carrying the apparatus, and 2 indicates a specimen chamber in which the specimen is bombarded with electrons to produce characteristic X-rays. Preferably the electron beam is focussed so that the bombardment is confined to a small area and in this way local impurities in the specimen can be detected.

The X-rays emitted by the specimen are directed to impinge on a reflecting crystal 3 at a small angle so that they are reflected at the Bragg angle toward a detector 4, which may be of any suitable type such as a Geiger counter. The crystal 3 is carried on an arm 5 which is mounted on a pivotal shaft 6.

As explained above, the angle at which the X-rays are reflected from the crystal 3 will depend upon their wavelength. Thus for any one positioning of the crystal 3 and detector 4 only a limited band of wavelength of the X-rays will fall on the detector 4. Since the wavelength of the X-rays will depend upon the atomic number of the material from which they are emitted, this property is utilized to determine the material of which the specimen is composed.

In the particular arrangement shown in the drawing, this is carried out by moving the crystal 3 and detector 4 manually until a response is indicated by the detector 4.

To assure the correct relative movements of the crystal 3 and detector 4, the following construction is shown: the crystal 3 is carried on an arm 5 which is mounted on a pivotal shaft 6 which shaft also carries an arm 7 which is aligned with the arm 5 and fixed to it so that it constitutes an extension of the arm 5. The detector 4 is carried on a second arm 8 also pivotal about the shaft 6 but independently of the arms 5 and 7. A slider 9 is movable along the arm 7 and is coupled through a first link 10 with a fixed point 11 which is shown as a point on a fixed arm 12. The slider 9 is also coupled through a second link 13 with the end of an arm 14 which is an extension of the arm 8.

It will be appreciated that rotation of the arm 7 will rotate the crystal 3 about the operating circle shown as a chain dotted circle and will also rotate the detector 4 about the same circle. In the arrangement shown, it is assumed that the linkage is so arranged that the angular movement of the arm 8 is double that of the arm 5 so that the correct relative positioning is maintained. Furthermore, the detector 4 is pivoted on the arm 8 at the point 15 and is oriented by the parallel linkage 16, 17 and 18 so that it is always positioned to receive rays reflected from the crystal 3.

The linkages above shown are for explanatory purposes only and other linkages or gears may be employed. Preferably, the whole apparatus is remote controlled and moved until a response is obtained from the detector. The angular positioning of the linkage will then be a measure of the X-ray wavelength and this may be indicated for instance by the position of a pointer 19 on a scale 20 which may be calibrated directly in wavelengths.

Now it can be clearly seen that due to the angular movement required, such apparatus will only operate over a limited band of X-ray frequencies depending upon the crystal chosen as the reflector, and it will therefore only detect elements in a certain range of the periodic table. The present invention is concerned with providing apparatus of the kind described which will respond to a sufficiently wide band of frequencies to be capable of detecting a wide range of elements.

The number of different crystals will depend on the range of elements to be covered.

It is found that four different crystals, if suitably chosen, will enable substantially the full range of useful elements to be detected, and FIGS. 2 to 5 show a suitable form of crystal changer for four crystals.

The crystal changer is carried on an arm 22 which corresponds to the arm 5 shown in FIG. 1. The actual crystal changing is controlled from a control desk, not shown in the drawings. Position control signals from the control desk control a motor 23, mounted on the arm 22. The motor 23 acting through right angled gears 24, 25 and toothed belt 26 drives the Geneva drive wheel 27, which is provided with a drive pin 28 and locking cam surface 29 whereby it drives the slotted Geneva wheel 30 in a step by step movement, each step moving the Geneva wheel through a quadrant. It will be seen that the Geneva wheel 30 is provided with four radial slots 31 for engagement by the pin 28 and thus there are four possible positions of the wheel 30, each position being spaced apart by 90° and positioning a different crystal to act as the reflector.

It will be noted that the movement of the Geneva wheel 30 all takes place during about 90° movement of the drive wheel 27, and thus the stop and start of the motor are not critical and simple cams and switches may be used.

Expressed another way, the Geneva motion serves as a locating mechanism which has a plurality of crystal-position-locating ranges. So long as the Geneva motion is within the appropriate one of the ranges, the selected crystal is accurately indexed into its position. Thus, however imprecise the starting and stopping of the motor 23 or other prime mover may be, so long as the prime mover does not move the locating mechanism out of the appropriate locating range, the crystal is accurately positioned.

The angular positioning of the crystals on shaft S is however very critical, deviations depend upon the clearance between cam 29 on drive wheel 27 and cam surface on Geneva wheel 30 and this clearance can be made very small.

Figure 3:
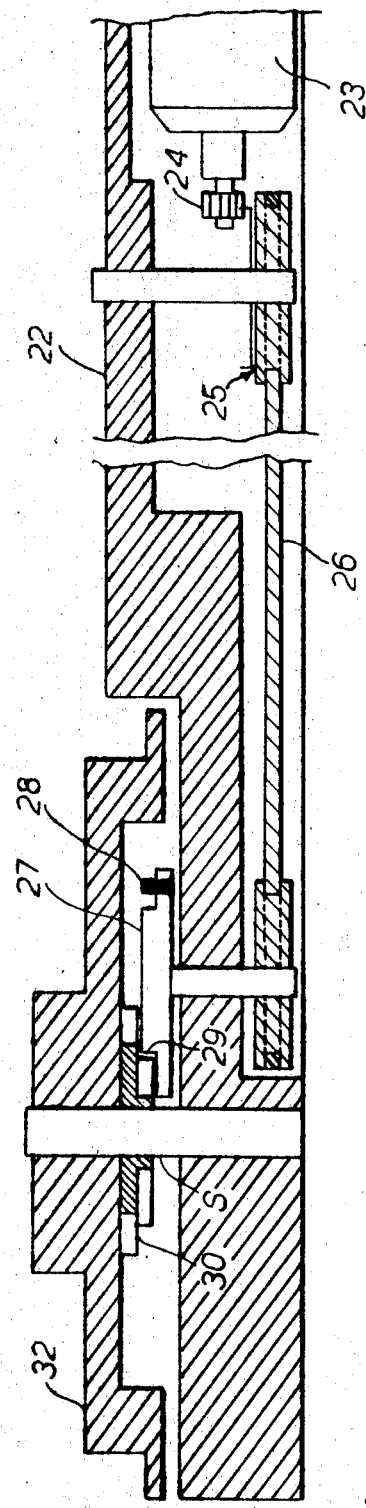
FIG. 3 is a vertical section generally along the line III—III of FIG. 2.

As shown more clearly in FIG. 3 the Geneva wheel 30 is mounted on the crystal changer assembly 32 which rotates about the shaft S.

Figure 4:
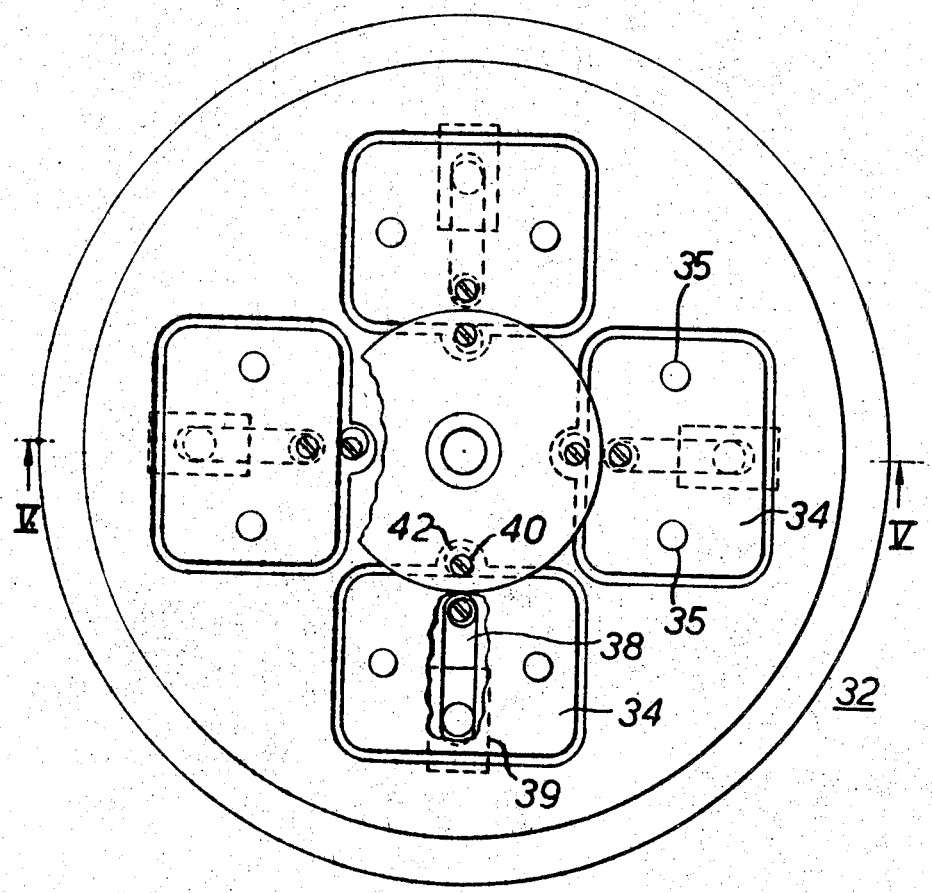
FIG. 4 is a plan view of the crystal carrier.
Figure 5:
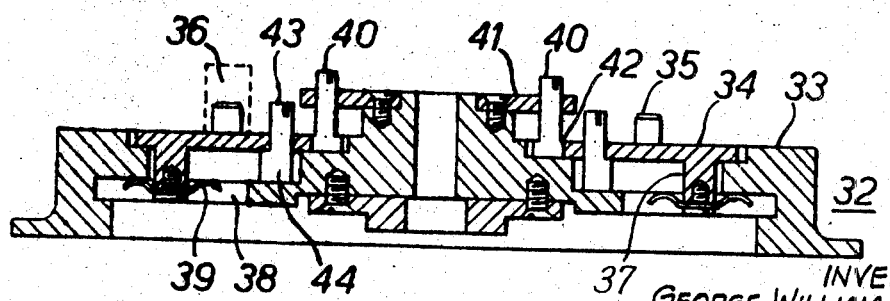
FIG. 5 is a vertical section generally along the line V—V of FIG. 4.

The crystal changer is shown more clearly in FIGS. 4 and 5 and comprises a circular block 33 on the upper face of which is mounted four crystal carrier plates 34, which are provided with dowel pins 35 for locating the crystals of which one is indicated by dotted lines at 36 in FIG. 5.

It can readily be seen that as the Geneva wheel 30 is rotated to its four positions, a different one of the crystals will be positioned for a study. When the arm 22 is manipulated, the positioned crystal is shifted to a location where it will receive X-rays during a study. Referring back to FIG. 1 it can be seen that if there are more than two crystals, the crystal carrier must be outside the operating circle so that the crystal which is effective has its reflecting face, which will be its side face, located on the operating circle.

As shown more clearly in FIG. 5, each of the crystal carrier plates 34 is formed with a downwardly extending pillar 37 which extends through a slot 38 in the block 33 and at its lower end carries a spring 39 which presses against a lower surface of the block 33 to hold the crystal holder clamped in position.

Provision is made for pre-setting the crystals on their respective carriers so that each crystal will be correctly oriented when the block 33 is rotated to position the crystal and thus avoid delay through adjusting a crystal whenever a crystal change is made. These adjustments are very critical. Radial adjustment of the crystals relative to the operating circle shown dashed in FIG. 1 can be carried out by turning shafts 40 mounted in top plate 41. These shafts at their lower ends, carry cam faces 42 which press against the inner edges of the respective crystal carrier plates 34. Angular adjustment of the crystals with respect to the tangent to the operating circle is provided by the adjustment shafts 43 which are mounted in the plates 34 and at their lower ends also carry cam faces 44 which are located in the slots 38 and are arranged to bear against the sides of the slots 38 to move the plates 34 laterally.

Clearly, to provide for detection over the useful range of the periodic table, the crystals must be suitably chosen with suitable crystal lattice spacing $2d$. The following table shows a suitable selection of crystals:

| Crystal | $2d$ | Wavelength range, A. | Element range |
|---|---|---|---|
| LiF | 4.02 | 0.7–3.3 | Magnesium-uranium. |
| Mica | 19.92 | 3.46–16.27 | |
| KAP | 26.6 | 4.6–21.8 | Fluorine-silicon. |
| Stearate | 100 | 17.4–82 | Boron-oxygen. |

If the first order reflection of wavelength, from the crystal only is considered, the Bragg equation can be expressed as $$\lambda = 2d \sin \theta$$

and the second column in the table gives the values for $2d$ in this expression.

Normally, the specimen is contained in a chamber from which the X-rays pass through a window, which prevents the escape of stray electrons. It has been found however that at the longer X-ray wavelengths, better results are obtained if there is direct communication between the specimen and the reflecting crystal and accordingly the specimen is housed in a chamber having a movable X-ray window. Control means are provided which are interlocked with the crystal changing control in such a manner that when crystals operating over the shorter wavelengths are in operation, the X-ray window is used but at the longer wavelengths the X-ray window is removed.

Figure 6:
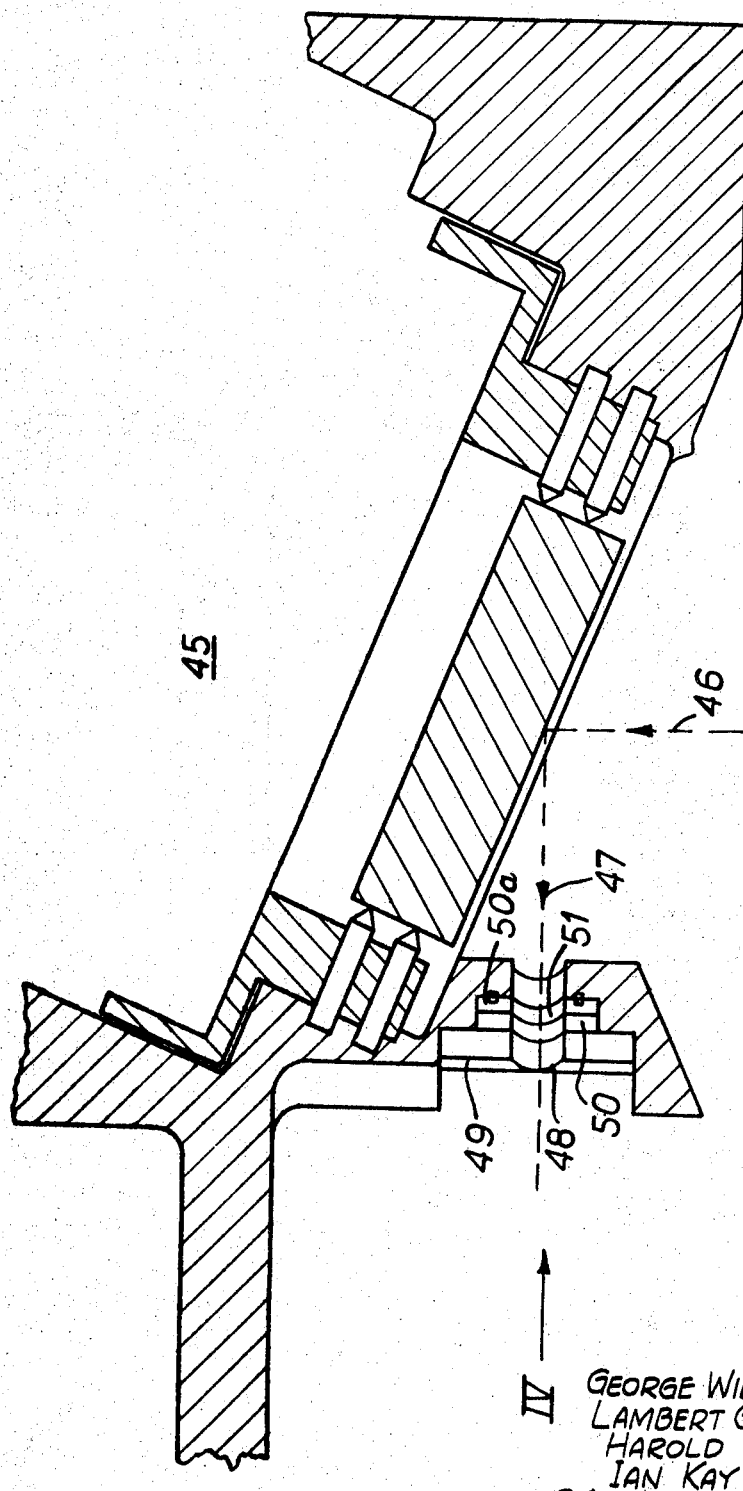
FIG. 6 is a sectional view of a portion of the specimen chamber.
Figure 7:
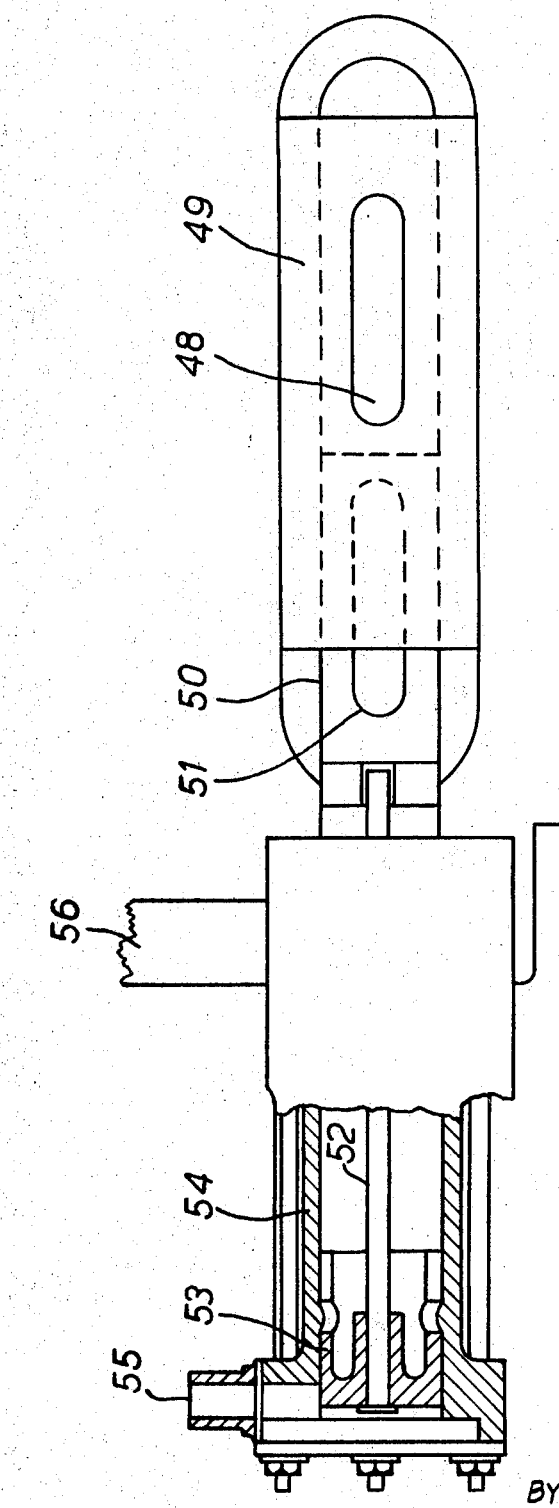
FIG. 7 is an end view of a portion of the apparatus shown in FIG. 6 looking in the direction of the arrow and showing the X-ray window and servo apparatus for operating the window.

FIGS. 6 and 7 show a construction for carrying this out. The reference numeral 45 indicates a specimen chamber housing and the dotted lines 46 represent the electron beam. Reference numeral 47 indicates the X-rays emitted from the specimen as a result of the bombardment, and the X-rays 47 pass through an opening 48 in the wall 49, which is normally closed by the slide 50 which is of material which easily passes X-rays. At the longer wavelengths however an aperture 51 in the slide 50 is aligned with the opening 48 so that there is direct communication, and although this will allow a certain amount of electron leakage it has been found to give an improved performance as regards detection of X-rays.

The slide 50 is connected by a rod 52 with a piston 53 operating in a cylinder 54 to which liquid or gas is fed through pipes 55 and 56 so that the piston 53 is moved from one end to the other depending on whether the opening 48 is to be open or covered.

The control for the operating fluid could be interlocked with the control for the crystal changing so that it will be automatically operated when the crystals are changed.

The slide 50 has a window 51 covered for example with a plastic film such as melinex which will pass X-rays of short wavelength, i.e., hard X-rays but will not pass the longer wavelength X-rays, i.e., soft X-rays. Thus the window will be opened when using the soft X-rays. As shown in FIG. 6, the melinex may be clamped between a front plate 50 and a rear plate 50a.

Alternatively the slide may be made without a window and of a material which cuts off all X-rays. In such a case the window must be opened for all X-ray wavelength ranges.

Figure 8:
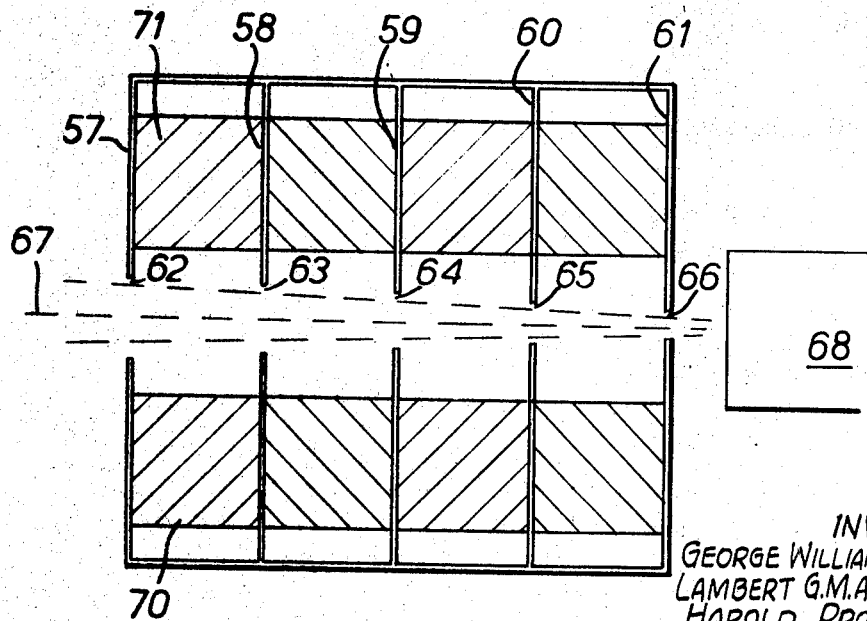
FIG. 8 is a plan view to an enlarged scale of an X-ray collimator.

The accuracy of detection of the X-rays may also be improved by excluding stray X-rays, i.e., X-rays other than those in the main beam and which arrive by reflection and also by removing any stray electrons. FIG. 8 shows somewhat diagrammatically one form of apparatus for carrying this out. The apparatus shown which is intended to be placed in front of a detector 68 is a combined collimator and beam trap. There are a number of screens, e.g., five screens 57 to 61 which are spaced apart and provided with vertical slit apertures 62 to 66 respectively, which in the arrangement shown are of progressively smaller width so that the X-ray beam 67 is progressively reduced in width and stray rays eliminated. Thus, rays falling on the detector 68 are substantially only those which have been reflected by the crystal.

For lithium fluoride and mica crystals no single rule is applied as to which is used, but the choice must depend upon such factors as interference from background or neighbouring sources. However, both are necessary in order to cover these ranges adequately.

The crystals KAP and stearate are required to cover the lighter ranges so that a minimum of four crystals is necessary to cover the full range of elements from boron upwards.

In order to remove any electrons, beam traps are provided by magnets between the screens which set up a cross magnetic field which deflects the electrons upwardly so that the chance of electrons passing through the slits is greatly reduced.

Figure 9:
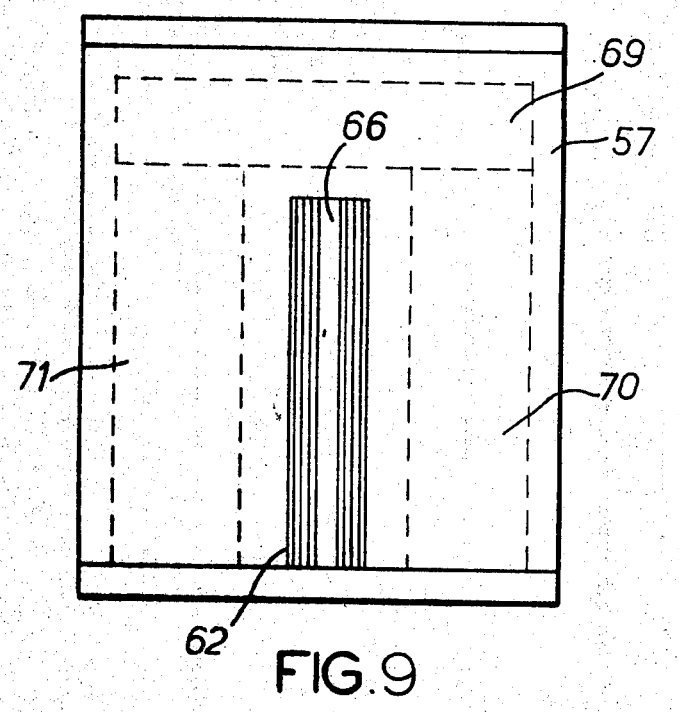
FIG. 9 is a front elevational view of the collimator shown in FIG. 8.

In the arrangement shown, there are four magnets each having a horizontal yoke and pole pieces of respective opposite polarities extending downwards on opposite sides respectively of the beam path. Thus the first magnet has a cross yoke 69 (FIG. 9) and pole pieces 70 and 71.

The remaining magnets may be similarly constructed.

Clearly the invention is not *limited* to four crystals but a greater number may be used.

What is claimed is:

1. In an X-ray analyzer including a specimen chamber and a detector, an improved crystal positioning apparatus comprising:
   (a) a carrier;
   (b) a plurality of crystals on the carrier;
   (c) said carrier being movable to index each of the crystals selectively and one at a time into position to receive X-rays emitted from the specimen chamber and to deflect certain of the rays into the detector;
   (d) a prime mover; and,
   (e) power-transmitting means coupling said prime mover to said carrier and including mechanism adapted when powered by said prime mover to move said carrier selectively and index a selected crystal into said position whereby the selected crystal may be positioned in response to a remote signal.

2. The analyzer of claim 1 wherein the power-transmitting means includes a Geneva motion.

3. The analyzer of claim 1 wherein said carrier is mounted on an arm and an arm swing means is coupled to the arm to swing it such that the selected and positioned crystal is swung on an arc which, when extended, passes through a portion of the specimen chamber and a portion of the detector.

4. The analyzer of claim 3 wherein said power-transmitting means is at least partially mounted on said arm.

5. The analyzer of claim 4 wherein said carrier includes means to adjust each of said crystals relative to said carrier whereby to precisely position each of said crystals relative to the carrier.

6. In an X-ray analyzer including a specimen chamber and a detector, an improved crystal-positioning apparatus comprising:
   (a) a carrier;
   (b) a plurality of crystals in the carrier;
   (c) said carrier being movable to index each of the crystals selectively and one at a time into position to receive X-rays emitted from the specimen chamber and to deflect certain of the rays into the detector;
   (d) a prime mover; and,
   (e) power-transmitting means coupling said prime mover to said carrier and including a locating means having a plurality of locating ranges and adapted when powered by said prime mover to move said carrier selectively and index a selected crystal into said position whenever the locating means is in one of said ranges whereby the ranges of the locating means accommodate imprecision in starting and stopping of power supply from the prime mover.

7. The analyzer of claim 6 wherein said locating means is a Geneva motion.

8. The analyzer of claim 6 wherein said carrier is mounted on an arm and an arm swing means is coupled to the arm to swing it such that the selected and positioned crystal is swung on an arc which, when extended, passes through a portion of the specimen chamber and a portion of the detector.

9. The analyzer of claim 8 wherein said power-transmitting means is at least partially mounted on said arm.

10. In an X-ray analyzer an improved crystal carrier comprising:
   (a) a carrier body member movably mounted on the analyzer and adapted to be indexed into a plurality of positions one at a time;
   (b) a plurality of crystal carriers mounted on the member and each adapted to carry a crystal in position for reflecting X-rays emitted by a specimen when indexed into reflecting position by movement of the member;
   (c) a plurality of adjustable eccentrics each interposed between the member and an associated carrier and adapted to adjust the associated carrier with respect to the member; and,
   (d) means yieldably retaining each of said carriers on the member while permitting adjustable movement of each of the carriers due to adjustments of the eccentrics.

11. In an X-ray analyzer including a specimen chamber and a detector, an improved crystal-positioning apparatus comprising:
(a) a carrier;
(b) a plurality of crystals in the carrier;
(c) said carrier being movable to index each of the crystals selectively and one at a time into position to receive X-rays emitted from the specimen chamber and to deflect certain of the rays into the detector;
(d) a drive means; and,
(e) power-transmitting means coupling said drive means to said carrier and including a locating means having a plurality of locating ranges and adapted when powered by said drive means to move said carrier selectively and index a selected crystal into said position whenever the locating means is in one of said ranges whereby the ranges of the locating means accommodate imprecision in starting and stopping of the drive means.

12. The analyzer of claim 11 wherein said locating means is a Geneva motion.

13. The analyzer of claim 11 wherein said carrier is mounted on an arm and an arm swing means is coupled to the arm to swing it such that the selected and positioned crystal is swung on an arc which, when extended, passes through a portion of the specimen chamber and a portion of the detector.

14. The analyzer of claim 13 wherein said power-transmitting means is at least partially mounted on said arm.

15. X-ray analyzing apparatus comprising means for bombarding a solid specimen to cause emission of X-rays, a first pivotal arm pivotal about an axis and carrying reflecting means for said X-rays, a second pivotal arm pivotal about the same axis and carrying a detector, means for positioning said arms about the pivot to direct reflected X-rays onto the detector, means for measuring the positioning of said arms to measure the angle of reflection, said reflecting means comprising a crystal carrier, a plurality of different crystals effective over different X-ray wavelength bands mounted on said carrier, and remotely-controllable means for rotating said carrier to bring any selected crystal into a precise preselected operative position to reflect X-rays onto the detector, said remotely-controllable means including means to precisely locate said carrier when a power source forming a portion of said remotely-controllable means is imprecisely controlled.

16. The apparatus of claim 15 wherein said crystal carrier further includes means for translationally adjusting the position of each crystal with respect to said carrier in a plane normal to said axis.

17. The apparatus of claim 16 further including means for rotationally adjusting the position of each crystal with respect to said carrier in said plane.

18. X-ray analyzing apparatus comprising means for bombarding a solid specimen to cause emission of X-rays, a first pivotal arm pivotal about an axis and carrying reflecting means for said X-rays, a second pivotal arm rotatable about the same axis and carrying a detector, means for positioning said arms about the pivot to direct X-rays onto the detector, means for measuring the positioning of said arms to measure the angle of reflection, said reflecting means comprising a crystal carrier, a plurality of different crystals effective over different X-ray wavebands mounted on said carrier, and remotely-controllable crystal changing means comprising a member rotatable about the pivotal axis of the arms and an operative connection between said member and the crystal carrier effective to produce a step-by-step rotational movement of the crystal carrier and to hold the crystal carrier locked in operative positions, said remotely-controllable means including means to precisely locate said carrier when a power source forming a portion of said remotely-controllable means is imprecisely controlled.

19. The apparatus of claim 18 wherein said crystal carrier further includes means for translationally adjusting the position of each crystal with respect to said carrier in a plane normal to said axis.

20. The apparatus of claim 19 further including means for rotationally adjusting the position of each crystal with respect to said carrier in said plane.

References Cited

UNITED STATES PATENTS

| 2,958,776 | 11/1960 | Jones et al. | 250—51.5 |
| 3,124,681 | 3/1964 | Zingaro | 250—51.5 |
| 3,160,747 | 12/1964 | De Vries | 250—51.5 |

WILLIAM F. LINDQUIST, Primary Examiner

A. L. BIRCH, Assistant Examiner

U.S. Cl. X.R.

250—49.5